Figure 1:
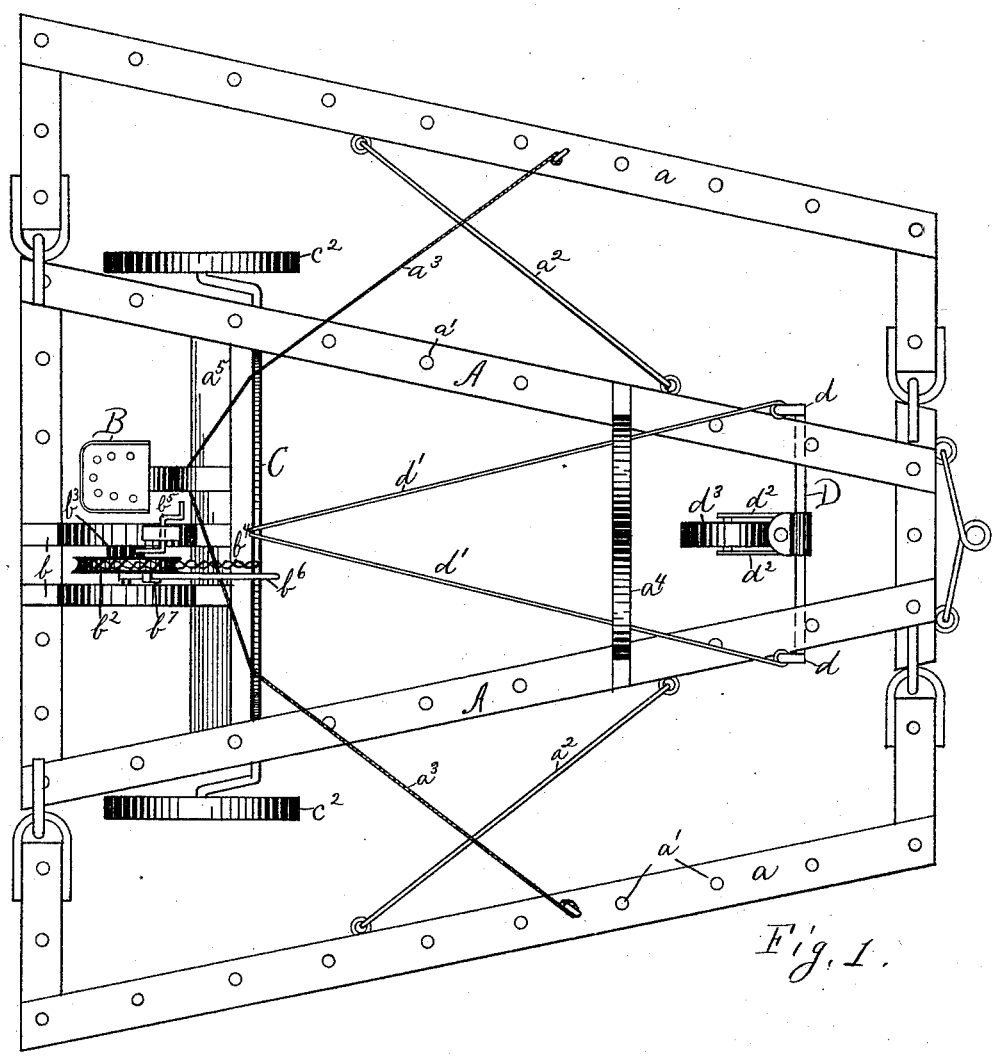

(No Model.) 2 Sheets—Sheet 1.

W. D. NAPIER.
HARROW.

No. 453,020. Patented May 26, 1891.

WITNESSES:
A. E. Glascock
M. E. Lansdale

INVENTOR
W. D. Napier
BY
John S. Duffie
ATTORNEY.

(No Model.) 2 Sheets—Sheet 2.
W. D. NAPIER.
HARROW.
No. 453,020. Patented May 26, 1891.
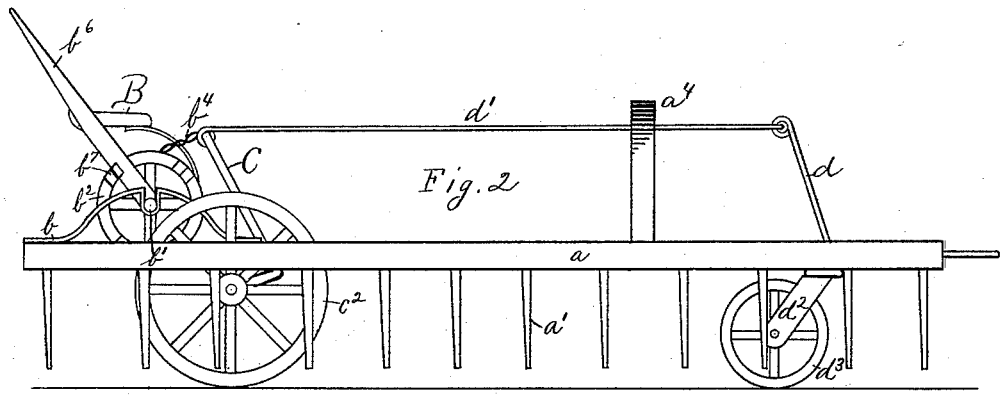
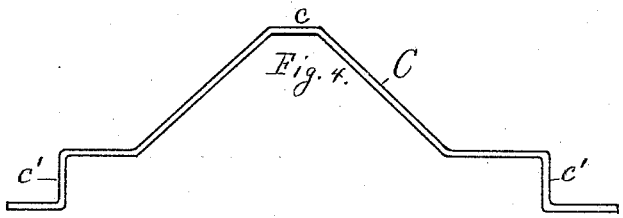
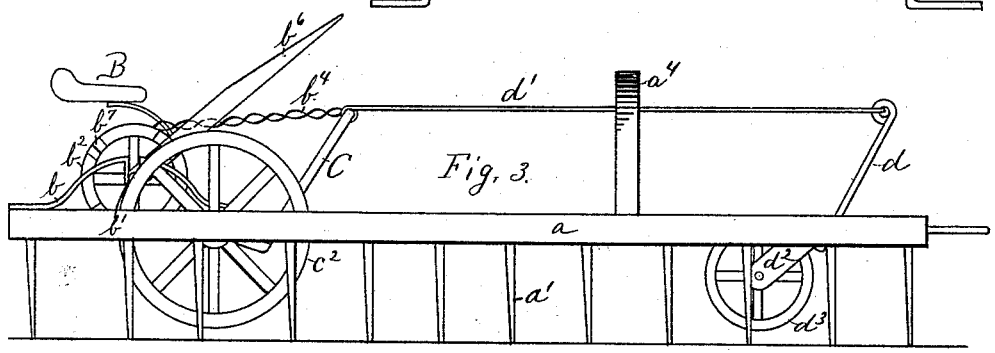
WITNESSES:
A. E. Glascock
M. E. Lansdale
INVENTOR
W. D. Napier,
BY
John S. Duffie
ATTORNEY.

UNITED STATES PATENT OFFICE.

WILLIAM D. NAPIER, OF MOUNTAIN HOME, ARKANSAS.

HARROW.

SPECIFICATION forming part of Letters Patent No. 453,020, dated May 26, 1891.

Application filed January 8, 1891. Serial No. 377,112. (No model.)

*To all whom it may concern:*

Be it known that I, WILLIAM D. NAPIER, a citizen of the United States, residing at Mountain Home, in the county of Baxter and State of Arkansas, have invented certain new and useful Improvements in Harrows; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to harrows; and it consists in the novel construction and arrangement of its parts.

In the accompanying drawings, Figure 1 is a top view of my invention. Figs. 2 and 3 are side views of my invention, and Fig. 4 is a detail view of the axle C.

My invention is described as follows: It consists of a harrow A, having the hinged wings $a$. Said harrow and teeth are provided with the usual teeth $a'$. The wings are braced to the harrow A by the rods $a^2$, attached as shown in Fig. 1. Said wings are further provided with a rope $a^3$, with which the operator, sitting in the ordinary spring-seat B, can swing said wings up and back on the harrow A. The outer side of the wings will rest on the top of the yoke $a^4$.

Harrow A is provided with an axle C, having the upper elbow $c$ and the lower elbows $c'$ $c'$. On the ends of said axle are journaled the wheels $c^2$. Said harrow has also an axle D, having its ends bent up and forming the arms $d$, to the upper ends of which are attached the front ends of the rods $d'$, the rear ends of which are attached to the upper elbow $c$ of the axle C. Said axle D has the arms $d^2$ pivoted to its middle, and between said arms is journaled the wheel $d^3$.

Harrow A is provided with a cross-piece $a^5$, on which is secured the spring-seat B and the front ends of the arms $b$, the rear ends of which are attached to the rear side of the said harrow. Said arms $b$ are provided with the bearings $b'$, in which is journaled the wheel $b^2$. Said wheel is provided with the ratchet-extension $b^3$, and the rim of said wheel is concaved to receive the chain $b^4$, the rear end of which is attached to said wheel and the front end to the elbow $c$ of the axle C. One of the arms $b$ is provided with a pawl $b^5$, one end of which works in the ratchet-extension $b^3$, and the other is provided with an angular extension (see Fig. 1) to be operated by the foot. On the axle of wheel $b^2$ is loosely journaled a lever $b^6$, which is adapted to catch in the lugs $b^7$ of said wheel $b^2$.

My invention is operated as follows: When it is desired to transport the harrow along a road or from one field to another without engaging the teeth with the ground, the lever $b^6$, working in the lugs $b^7$ of wheel $b^2$, is drawn to the rear, and thus, winding the chain $b^4$ around the periphery of said wheel $b^2$; the pawl on arm $b$ will hold the wheel $b^2$ in the desired position. When the chain $b^4$ is drawn back, the elbow $c$ of axle C is also drawn back. This will force the elbows $c'$ $c'$, on which are the wheels $c^2$, down, and as said axle passes under the harrow A (see Fig. 1) said harrow and teeth will be raised up off the ground, the wheel $d^3$ lifting the front part of the harrow in a similar manner. (See Fig. 2.) Then the two wings are swung back upon the harrow A, and it is then ready for transportation. When it is desired to engage the teeth with the ground, the operator simply releases the pawl $b^5$ from the ratchet-extension $b^3$, and the teeth are thus lowered. (See Fig. 3.)

Having described my invention, what I claim as new, and desire to secure by Letters Patent, is—

In combination with a harrow A, having the cross-piece $a^5$ and wings $a$, axle C, having the elbows $c$ and $c'$ and wheels $c^2$, axle D, having the arms $d$ and caster $d^3$, rods $d'$, arms $b$, having the bearings $b'$, wheel $b^2$, having the ratchet-extension $b^3$, chain $b^4$, pawl $b^5$, and lugs $b^7$, lever $b^6$, arms $a^2$, rope $a^3$, and yoke $a^4$, all substantially as shown and described, and for the purposes set forth.

In testimony whereof I affix my signature in presence of two witnesses.

WILLIAM D. NAPIER.

Witnesses:
WM. H. MORRIS,
J. S. RUSSELL.